Patented June 15, 1954

2,681,319

UNITED STATES PATENT OFFICE 2,681,319

PERMSELECTIVE FILMS OF ANION-EXCHANGE RESINS

George W. Bodamer, Cheltenham, Pa., assignor to Rohm & Haas Company, Philadelphia, Pa., a corporation of Delaware No Drawing. Application January 10, 1951, Serial No. 205,413

13 Claims. (Cl. 260—2.1)

This invention relates to permselective films, sheets or pellicles containing anion-exchange resins and to a process for making them.

An object of this invention is to provide films of bonded particles of anion-exchange resins, which films are permselective and are particularly adapted for use in commercial electrolytic processes and in the deionization of fluids. An object is to provide ion-exchange films which are permselective as to particles carrying a negative electric charge and which, therefore, permit the passage of anions through the films while at the same time preventing passage through the films of undesirable amounts of cations. A further object is to provide films which are strong and self-supporting and which can be handled and can be mounted on or attached to structural members, and which also are durable and remain intact in the presence of acids, bases and salts of high or low concentrations.

The objects are accomplished by this invention which comprises uniformly and intimately dispersing an anion-exchange resin, of the strongly or weakly basic type, in a film or matrix of a polymer from the class consisting of polyethylene, polyisobutylene, vulcanized natural and synthetic rubber, polyvinyl chloride and copolymers of vinyl chloride and the vinyl esters of lower aliphatic acids. The resultant products are self-supporting films, sheets or pellicles which are physically strong and which are like layers of anion-exchange resin, so far as their activity and utility are concerned.

Such permselective films are valuable as tools in physicochemical studies. They can also be used to great advantage in a wide variety of industrial processes, as in the decolorizing of sugar solutions. They are also particularly useful when used in conjunction with cationic permselective films such as are described in my application Serial No. 202,577 filed December 23, 1950.

The films are made by intimately and uniformly dispersing particles of an anion-exchange resin in a matrix or binder of a polymer from the class described above. All of these polymers are well known and are available commercially. For example, polyethylene is marketed as "Polythene." The synthetic rubbers include the polymers of butadiene-1,3, as well as the copolymers of butadiene-1,3, and other copolymerizable compounds which contain the vinylidene group, $CH_2=CH<$. Examples of suitable synthetic rubbers include the polymers of butadiene-1,3 per se, methyl-2-butadiene-1,3 (isoprene), chloro-2-butadiene-1,3 (chloroprene or neoprene), as well as the copolymers of butadiene-1,3 and styrene, known as "Buna S" or "GR-S" rubber, copolymers of butadiene-1,3 and acrylonitrile, known as "Buna N," "GR-A" or "Hycar" rubber. These synthetic rubbers as well as natural rubber are mixed with the particles of anion-exchange resin, formed into a sheet or film and then vulcanized by conventional methods. The permselective films, which are made from copolymers of vinyl chloride and the vinyl esters of the lower aliphatic acids which contain up to four carbon atoms such as vinyl acetate, are more fragile than the films containing polyethylene or the vulcanized rubbers described above, and therefore are more limited in utility. Films made from anion-exchange resins and the above polymeric materials have a balance of physical and chemical properties which permits their successful and continued use in chemical operations where other films, such as those made from polystyrene, polymethylmethacrylate and phenolic resins, fail.

The anion-exchange resins which are incorporated in the films of this invention are those of the weakly basic and strongly basic types, many of which are available commercially. The weakly basic resins include those which are described and discussed in U. S. Patents Nos. 2,106,486; 2,151,883; 2,223,930; 2,251,234; 2,259,169; 2,285,750; 2,341,907; 2,354,671; 2,354,672; 2,356,141; 2,366,008; 2,388,235 and 2,402,384 as well as in C. H. McBurney's patent application Serial No. 759,309, filed July 5, 1947 now Patent No. 2,591,574. The resins described in Patent No. 2,591,574 are made by chloroalkylating an insoluble copolymer of a monovinyl aromatic hydrocarbon and a divinyl aromatic hydrocarbon and then reacting the chloroalkylated copolymer with a primary or a secondary amine, whereby amino groups are introduced into the resinous, insoluble copolymer. All of the resins which are disclosed in these patents and by McBurney are capable of sorbing acids but they are not capable of splitting neutral salts such as sodium chloride to a significant extent. In contrast are the strongly basic anion-exchange resins such as those described in C. H. McBurney's patent application Serial No. 759,308, filed July 5, 1947 now Patent No. 2,591,573 and in British patent applications Serial Nos. 28,871; 28,873; 28,874 and 28,878 filed November 10, 1949. These resins are unique in that they are capable of splitting salts such as sodium chloride and do actually exchange anions such as hydroxyl ions for chloride ions, sulfate ions for chloride ions and so on. Films containing weakly basic anion-exchange resins differ from films containing the strongly basic quaternary ammonium anion-exchange resins in much the same way as the two kinds of resins differ from each other in the free form and all of the films have real commercial value and utility.

The resins in the films can be in the form of irregularly shaped particles, as a result of grinding, or in the form of spheroids. While the size of the particles can vary within reasonable limits, it is definitely preferred that they be small. All of the particles should be small enough to pass through a U. S. Standard sieve No. 50 and preferably through a U. S. Standard sieve No. 100.

The amount of resin in the film or sheet is an important factor since the physical properties, such as density and porosity of the film, as well as the chemical properties, such as permselectivity and the rate of migration of anions through the film, are dependent on the proportions of resin and binder in the film. The porosity, leakage, and brittleness of the film increase with an increase in the amount of resin, as does the rate of migration of anions through the film. Another consideration is the fact that the particles of resin swell in contact with the aqueous solutions and the ratio of resin to binder must be such that the film is not ruptured as the resin swells. For commercial applications—and the invention is concerned primarily with products having commercial or industrial utility—the dry resin should constitute from 25% to 75% of the total weight of the dry film.

The most convenient methods for making the films of this invention are currently those which are customarily used in preparing sheets of rubber and plastics. Thus, for example, the resin and binder are mixed and mechanically worked on a roller mill—preferably a heated mill—and the film is then stripped from the roller. Or, a film can be sliced from a block of a mixture of resin and binder. Also, a film can be made by spraying a hot mixture of the two components by means of a flame gun. Alternatively, a suspension of the components; e. g., a latex emulsion containing the resin particles, can be laid down as a film and thereafter modified, if desired, by the application of heat and mechanical pressure. Irregularities in the films can be reduced by pressing the films in a platen press or between rollers. Other sheet-forming methods can be employed and this invention which resides in a new kind of durable, permselective, anionic film is not to be limited by the particular mechanical technique or operation by which the film is formed. What is essential is that the anion-exchange resin be evenly dispersed throughout the film and that the particles of resin extend contiguously throughout the entire thickness of film. These requirements are met when the proper ratio of essential components is employed and when the two are thoroughly, intimately, and uniformly mixed.

Herein the word "film" is used in the accepted sense as being synonymous with "sheet" or "pellicle" and as describing a thin layer of material. Thick blocks or slabs or layers can function as permselective bodies. But the products of this invention are films which are permselective and at the same time are easily prepared, handled, installed, and utilized. Films which have a thickness of about 10 to 100 mils are eminently satisfactory for most industrial applications and are preferred.

Following is a description of the preferred procedure by which the films of this invention are prepared.

Example 1

Fifty parts by weight of polyethylene was sheeted out on a rubber mill heated to 220°–240° F. There was then added 150 parts of a strongly basic quaternary ammonium anion-exchange resin in the chloride form, prepared by the process of application Serial No. 759,308 by aminating with trimethylamine a chloromethylated copolymer of 94% styrene and 6% divinylbenzene. The resin was in the form of spheroids, all of which passed through a U. S. Standard sieve No. 100. The mixture was milled at about 230° F. for an hour until the dispersion of the anion-exchange resin in the polyethylene was uniform. The mill was cooled and the sheet was stripped off. At room temperature it was flexible but not elastic and could be handled and fastened with clamps to an apparatus. The film was 40 mils in thickness but, on soaking in water, swelled 50% in thickness.

Example 2

In the same manner as described in Example 1 an anionic film was made by mixing and milling 100 parts of polyethylene, 20 parts of polyisobutylene, and 80 parts of the strongly basic resin which was employed in Example 1. Milling was carried out at 230° F. for one-half hour and the stripped film was flexible at room temperature and swelled about 50% in thickness on being soaked overnight in water.

Example 3

One hundred parts by weight of polyethylene was sheeted out on a rubber mill heated to 220°–240° F. Then there was added 100 parts of a weakly basic anion-exchange resin in the chloride form, prepared by the process of application Serial No. 759,309 by aminating with diethylenetriamine a chloromethylated copolymer of 96% styrene and 4% divinylbenzene. The resin was in the form of spheroids, all of which passed through a U. S. Standard sieve No. 100. The mixture was milled at 230° F. for an hour until the dispersion of the anion-exchange resin in the polyethylene was uniform. The sheet was stripped off and on cooling to room temperature was very flexible but low in elasticity.

Example 4

A mixture of equal weights of a commercially available synthetic rubber, made by copolymerizing butadiene and acrylonitrile, and of particles of a strongly basic anion-exchange resin in the chloride form, made by the process of application Serial No. 759,308 by aminating with dimethylamino ethanol a chloromethylated copolymer of 94% styrene and 6% divinylbenzene, was milled at room temperature for an hour together with 1% sulfur, 5% zinc oxide, and 1.5% of a commercial vulcanizing accelerator (Altex) based on the rubber. The film which was uniform in appearance was stripped from the roller and was then vulcanized at 300° F. for 45 minutes in a heated press under a pressure of 1000 lbs./sq. inch. When it was cooled to room temperature, this film was flexible, elastic, and permselective.

Example 5

In a manner like that described in Example 4, another permselective film was prepared by milling on a roller mill for one hour at room temperature equal parts of "GR–S" synthetic rubber, made by copolymerizing butadiene and styrene, and of particles of the anion-exchange resin employed in Example 2 above. There was also milled into the film 2.5% sulfur, 1.5% of a vulcanization accelerator, and 5% zinc oxide, all based on the weight of the rubber. The film was stripped from the roller and was then vulcanized at 300° F. for 45 minutes in a heated press under a pressure of 1000 lbs./sq. in. The film was both tough and elastic.

*Example 6*

Another permselective film was made by milling and thoroughly mixing 150 parts of a copolymer of 95% vinyl chloride and 5% vinyl acetate and 150 parts of the same anion-exchange resin employed in Example 3 above. The milling was done on a roller-mill over a period of one hour at 300° F. and the resultant film on cooling was 50 mils in thickness and was uniform in appearance. It was definitely less flexible than the films described in the above examples and for this reason required more care in handling. It was, however, permselective and could be mounted on a support for use in electrolytic and deionization operations. Another film in which a quarter of the polyvinyl resin was replaced by a linear polyester resin made from propylene glycol and sebacic acid was likewise permselective and had the additional advantage of being more flexible.

All of the films which are embraced by this invention and which are exemplified above are permselective in the accepted sense that they permit the passage of anions through the films but definitely deter the passage of cations therethrough. This characteristic permselectivity is better understood from a consideration of the following test: A diffusion cell was set up by clamping a permselective film between two opposed L-shaped glass tubes having an inside diameter of two inches. Into one L-tube was poured 300 cc. of an aqueous solution of magnesium sulfate (approximately 0.1 N). Into the other L-tube was poured 300 cc. of an aqueous solution of sodium chloride (approximately 0.1 N). By this arrangement the two solutions were separated by only the permselective film which was made by the process described in Example 1 above. The concentration of magnesium ions and chloride ions in each side of the cell was measured at the start and after seven days by standard techniques. Also the total concentration of anions in each solution was measured. This was done by passing samples through a bed of a cation-exchange resin in the hydrogen form which adsorbed the sodium and magnesium ions and liberated hydrogen ions which were titrated with a standard solution of sodium hydroxide. The total concentration of anions in either side of the cell is, of course, always equivalent to the total concentration of cations. Following is a tabulation of the measurements and a record of the kind and degree of diffusion which took place through the film during the seven days. Concentration is expressed in milliequivalents.

|  | At Start | | After 7 Days | |
| --- | --- | --- | --- | --- |
|  | MgSO₄ Side | NaCl Side | MgSO₄ Side | NaCl Side |
| Magnesium Ions | 29.28 | 0.00 | 28.86 | 0.16 |
| Chloride Ions | 0.69 | 29.40 | 11.70 | 19.32 |
| Total Anions |  |  | 31.2 | 29.4 |

With due allowance for experimental error, it is at once apparent that the anions as measured by the chloride ion migrated through the permselective film to a far greater extent than did the cations as measured by the magnesium ion. The diffusion of the magnesium and chloride ions was balanced respectively by a diffusion of the sodium and sulfate ions in the opposite direction.

I claim:

1. A permselective, anionic pellicle comprising discrete particles of an insoluble, infusible anion-exchange resin dispersed intimately and uniformly throughout a matrix which is a polymeric material from the class consisting of solid polyethylene, polyisobutylene, vulcanized natural rubber, vulcanized rubbery homopolymers of butadiene-1,3, vulcanized rubbery synthetic polymers of methyl-2-butadiene-1,3, vulcanized rubbery polymers of chloro-2-butadiene-1,3, vulcanized rubbery copolymers of butadiene-1,3 and styrene, vulcanized rubbery copolymers of butadiene-1,3 and acrylonitrile, polyvinylchloride, and copolymers of vinylchloride and vinyl esters of lower fatty acids, said particles being of such a size as to pass through a U. S. Standard sieve No. 50 and being present in an amount equal to 25% to about 75% of the total dry weight of said pellicle.

2. A permselective, anionic pellicle comprising discrete particles of an insoluble, infusible, weakly basic anion-exchange resin dispersed intimately and uniformly throughout a matrix which is a polymeric material from the class consisting of solid polyethylene, polyisobutylene, vulcanized natural rubber, vulcanized rubbery homopolymers of butadiene-1,3, vulcanized rubbery synthetic polymers of methyl-2-butadiene-1,3, vulcanized rubbery polymers of chloro-2-butadiene-1,3, vulcanized rubbery copolymers of butadiene-1,3 and styrene, vulcanized rubbery copolymers of butadiene-1,3 and acrylonitrile, polyvinylchloride, and copolymers of vinylchloride and vinyl esters of lower fatty acids, said particles being of such a size as to pass through a U. S. Standard sieve No. 50 and being present in an amount equal to 25% to about 75% of the total dry weight of said pellicle.

3. A permselective, anionic pellicle comprising discrete particles of an insoluble, infusible, strongly basic anion-exchange resin dispersed intimately and uniformly throughout a matrix which is a polymeric material from the class consisting of solid polyethylene, polyisobutylene, vulcanized natural rubber, vulcanized rubbery homopolymers of butadiene-1,3, vulcanized rubbery synthetic polymers of methyl-2-butadiene-1,3, vulcanized rubbery polymers of chloro-2-butadiene-1,3, vulcanized rubbery copolymers of butadiene-1,3 and styrene, vulcanized rubbery copolymers of butadiene-1,3 and acrylonitrile, polyvinylchloride, and copolymers of vinylchloride and vinyl esters of lower fatty acids, said particles being of such a size as to pass through a U. S. Standard sieve No. 50 and being present in an amount equal to 25% to about 75% of the total dry weight of said pellicle.

4. A permselective, anionic pellicle comprising discrete particles of an insoluble, infusible, strongly basic anion-exchange resin, which is the reaction product of a tertiary amine and a cross-linked chloromethylated copolymer of styrene and divinylbenzene, dispersed intimately and uniformly throughout a matrix which is a polymeric material from the class consisting of solid polyethylene, polyisobutylene, vulcanized natural rubber, vulcanized rubbery homopolymers of butadiene-1,3, vulcanized rubbery synthetic polymers of methyl-2-butadiene-1,3, vulcanized rubbery polymers of chloro-2-butadiene-1,3, vulcanized rubbery copolymers of butadiene-1,3 and styrene, vulcanized rubbery copolymers of butadiene-1,3 and acrylonitrile, polyvinylchloride, and copolymers of vinylchloride and vinyl esters of lower fatty acids, said particles being of such a size as to pass through a U. S. Standard sieve No. 50 and being present in an amount equal to 25% to about 75% of the total dry weight of said pellicle.

5. A flexible, permselective, anionic pellicle comprising discrete particles of an infusible, insoluble anion-exchange resin dispersed intimately and uniformly throughout a matrix of vulcanized natural rubber, said particles being of such a size as to pass through a U. S. Standard sieve No. 50 and being present in an amount equal to 25% to about 75% of the total dry weight of said pellicle.

6. A flexible, permselective, anionic pellicle comprising discrete particles of an infusible, insoluble anion-exchange resin dispersed intimately and uniformly throughout a matrix of a vulcanized rubbery copolymer of butadiene-1,3 and styrene, said particles being of such a size as to pass through a U. S. Standard sieve No. 50 and being present in an amount equal to 25% to about 75% of the total dry weight of said pellicle.

7. A flexible, permselective, anionic pellicle comprising discrete particles of an infusible, insoluble anion-exchange resin dispersed intimately and uniformly throughout a matrix of a vulcanized rubbery copolymer of butadiene-1,3 and acrylonitrile, said particles being of such a size as to pass through a U. S. Standard sieve No. 50 and being present in an amount equal to 25% to about 75% of the total dry weight of said pellicle.

8. A flexible, permselective, anionic pellicle comprising discrete particles of an infusible, insoluble anion-exchange resin dispersed intimately and uniformly throughout a matrix of a copolymer of vinyl chloride and vinyl acetate, said particles being of such a size as to pass through a U. S. Standard sieve No. 50 and being present in an amount equal to 25% to about 75% of the total dry weight of said pellicle.

9. A flexible, permselective, anionic pellicle comprising discrete particles of an infusible, insoluble anion-exchange resin dispersed intimately and uniformly throughout a matrix of solid polyethylene, said particles being of such a size as to pass through a U. S. Standard sieve No. 50 and being present in an amount equal to 25% to about 75% of the total dry weight of said pellicle.

10. A flexible, permselective, anionic pellicle comprising discrete particles of an infusible, insoluble, strongly basic anion-exchange resin dispersed intimately and uniformly throughout a matrix of solid polyethylene, said particles being of such a size as to pass through a U. S. Standard sieve No. 50 and being present in an amount equal to 25% to about 75% of the total dry weight of said pellicle.

11. A flexible, permselective, anionic pellicle comprising discrete particles of an infusible, insoluble, strongly basic anion-exchange resin, which is the reaction product of a tertiary amine and a cross-linked chloromethylated copolymer of styrene and divinylbenzene, dispersed intimately and uniformly throughout a matrix of solid polyethylene, said particles being of such a size as to pass through a U. S. Standard sieve No. 50 and being present in an amount equal to 25% to about 75% of the total dry weight of said pellicle.

12. A flexible, permselective, anionic pellicle comprising discrete particles of an infusible, insoluble anion-exchange resin dispersed intimately and uniformly throughout a matrix of a vulcanized rubbery copolymer of butadiene-1,3 and styrene, said particles having a size no greater than 100 microns and being present in an amount equal to 50% to about 75% of the total dry weight of said pellicle.

13. A flexible, permselective, anionic pellicle comprising discrete particles of an infusible, insoluble anion-exchange resin dispersed intimately and uniformly throughout a matrix of a vulcanized rubbery copolymer of butadiene-1,3 and acrylonitrile, said particles having a size no greater than 100 microns and being present in an amount equal to 50% to about 75% of the total weight of said pellicle.

References Cited in the file of this patent

UNITED STATES PATENTS

| Number | Name | Date |
| --- | --- | --- |
| 2,434,190 | Barnes et al. | Jan. 6, 1948 |
| 2,450,409 | Baymiller | Oct. 5, 1948 |
| 2,578,186 | Ham | Dec. 11, 1951 |
| 2,614,976 | Patnode et al. | Oct. 21, 1952 |
| 2,636,851 | Juda et al. | Apr. 28, 1953 |

OTHER REFERENCES

Juda et al., Jour. Am. Chem. Soc., vol. 72, p. 1044, Feb. 1950.

Wyllie et al., J. Phys. and Colloid Chem., vol. 54, pp. 204–227, Feb. 1950.

Fisher, India Rubber Journal, January 27, 1940, pages 85–89.